(12) United States Patent
Kulas

(10) Patent No.: US 10,043,553 B2
(45) Date of Patent: Aug. 7, 2018

(54) USER CONTROL FOR DISPLAYING TAGS ASSOCIATED WITH ITEMS IN A VIDEO PLAYBACK

(71) Applicant: Gula Consulting Limited Liability Company, Dover, DE (US)

(72) Inventor: Charles J. Kulas, San Francisco, CA (US)

(73) Assignee: Gula Consulting Limited Liability Company, Dover, DE (US)

( * ) Notice: Subject to any disclaimer, the term of this patent is extended or adjusted under 35 U.S.C. 154(b) by 0 days.

(21) Appl. No.: 15/590,958

(22) Filed: May 9, 2017

(65) Prior Publication Data

US 2017/0243618 A1  Aug. 24, 2017

Related U.S. Application Data

(63) Continuation of application No. 11/562,965, filed on Nov. 22, 2006, now Pat. No. 9,648,296, which is a
(Continued)

(51) Int. Cl.
| | |
|---|---|
| *H04N 9/80* | (2006.01) |
| *G11B 27/34* | (2006.01) |
| *G11B 27/10* | (2006.01) |
| *G11B 27/00* | (2006.01) |
| *H04N 21/84* | (2011.01) |

(Continued)

(52) U.S. Cl.
CPC ............ *G11B 27/34* (2013.01); *G11B 27/005* (2013.01); *G11B 27/102* (2013.01); *H04N 21/4725* (2013.01); *H04N 21/47217* (2013.01); *H04N 21/8133* (2013.01); *H04N 21/84* (2013.01)

(58) Field of Classification Search
CPC ..... G11B 27/34; G11B 27/102; G11B 27/005; H04N 21/47217; H04N 21/8133; H04N 21/4725; H04N 21/84
See application file for complete search history.

(56) References Cited

U.S. PATENT DOCUMENTS

| | | |
|---|---|---|
| 5,734,862 A | 3/1998 | Kulas |
| 5,835,669 A | 11/1998 | Hirayama et al. |
| | (Continued) | |

OTHER PUBLICATIONS

U.S. Appl. No. 11/499,315 Prosecution History as of Nov. 24, 2017.
(Continued)

*Primary Examiner* — Tat C Chio

(57) ABSTRACT

A method controls display of one or more visually perceptible tags in association with a video. The method receives a first signal from a user input control device while the video is being presented via a display device without any visually perceptible tags. The first signal is generated by the user input control device in response to activation of a control associated with a function of causing the display device to present the video with the at least one visually perceptible tag. In response to receiving the first signal, the method causes the display device to present the video with at least one visually perceptible tag. After causing the display device to present the video with the at least one visually perceptible tag, the method changes the function associated with the control to thereafter cause the display device to present the video without any visually perceptible tags.

20 Claims, 8 Drawing Sheets

Related U.S. Application Data continuation-in-part of application No. 11/499,315, filed on Aug. 4, 2006.

(51) Int. Cl.
*H04N 21/81* (2011.01)
*H04N 21/4725* (2011.01)
*H04N 21/472* (2011.01)

(56) References Cited

U.S. PATENT DOCUMENTS

| | | | |
|---|---|---|---|
| 5,929,849 A | 7/1999 | Kikinis | |
| 5,987,509 A | 11/1999 | Portuesi | |
| 6,026,376 A | 2/2000 | Kenney | |
| 6,119,147 A | 9/2000 | Toomey et al. | |
| 6,219,839 B1 | 4/2001 | Sampsell | |
| 6,282,713 B1 | 8/2001 | Kitsukawa et al. | |
| 6,289,165 B1 | 9/2001 | Abecassis | |
| 6,424,370 B1 | 7/2002 | Courtney | |
| 6,580,870 B1 * | 6/2003 | Kanazawa | G11B 27/34 386/240 |
| 6,701,064 B1 | 3/2004 | De Haan et al. | |
| 6,725,215 B2 | 4/2004 | Yamamoto | |
| 6,850,694 B1 | 2/2005 | Moro et al. | |
| 7,027,101 B1 | 4/2006 | Sloo et al. | |
| 7,133,837 B1 | 11/2006 | Barnes | |
| 7,487,112 B2 | 2/2009 | Barnes | |
| 7,831,917 B1 | 11/2010 | Karam | |
| 7,917,922 B1 | 3/2011 | Schwab et al. | |
| 9,648,296 B2 | 5/2017 | Kulas | |
| 2002/0120931 A1 | 8/2002 | Huber et al. | |
| 2003/0086690 A1 * | 5/2003 | Chung | G06F 17/214 386/240 |
| 2004/0081437 A1 | 4/2004 | Asada et al. | |
| 2004/0086263 A1 | 5/2004 | Arora | |
| 2004/0126085 A1 | 7/2004 | Braun et al. | |
| 2004/0143789 A1 | 7/2004 | Chung et al. | |
| 2004/0189868 A1 | 9/2004 | Molaro et al. | |
| 2004/0236504 A1 | 11/2004 | Bickford et al. | |
| 2004/0248561 A1 | 12/2004 | Nykanen et al. | |
| 2005/0031315 A1 | 2/2005 | Kageyama et al. | |
| 2005/0086690 A1 | 4/2005 | Gilfix et al. | |
| 2005/0191041 A1 | 9/2005 | Braun et al. | |
| 2005/0201725 A1 | 9/2005 | Braun et al. | |
| 2005/0213946 A1 | 9/2005 | Braun | |
| 2005/0220439 A1 | 10/2005 | Carton et al. | |
| 2005/0278747 A1 | 12/2005 | Barton et al. | |
| 2006/0078297 A1 * | 4/2006 | Nishikawa | H04N 5/76 386/243 |
| 2006/0150100 A1 | 7/2006 | Braun et al. | |
| 2006/0248556 A1 | 11/2006 | Yuen et al. | |
| 2007/0021211 A1 | 1/2007 | Walter | |
| 2008/0031590 A1 | 2/2008 | Kulas | |
| 2008/0034295 A1 * | 2/2008 | Kulas | H04N 21/812 715/723 |
| 2008/0046956 A1 * | 2/2008 | Kulas | H04N 21/4725 725/136 |
| 2008/0154908 A1 | 6/2008 | Datar et al. | |

OTHER PUBLICATIONS

U.S. Appl. No. 11/562,965 Prosecution History.
U.S. Appl. No. 11/677,573 Prosecution History.
Butler, Phil, Mojiti—Testing for Fun, Profy, http://profy.com/2007/01/29/mojiti-bubbles/ (Jan. 29, 2007).
De Rossi, Luigi Canali Subtitling and Dubbing Your Internet Video, http://www.masternewmedia.org/news/2007/02/06/subtitling_and_dubbing_your_internet.htm (Feb. 6, 2007).
Mojiti Video in Your Own Words, http://web.archive.org/web/20071009074408/http://mojiti.com/learn/personalize (Oct. 9, 2007).
Silberberg, Yoni, "New BubblePly.com Website Allows Users to Add Creative Layers on Top of Online Video," Jan. 29, 2007, http://bubbleply.com (4 pages).
U.S. Appl. No. 11/499,315, filed Aug. 4, 2006.
U.S. Appl. No. 11/677,573, filed Feb. 21, 2007.
U.S. Appl. No. 11/562,965, filed Nov. 22, 2006.
PTAB, Appeal Decision (Jul. 25, 2016) in U.S. Appl. No. 11/499,315.
Amendment (filed Feb. 7, 2017) in U.S. Appl. No. 11/499,315.

* cited by examiner

USER CONTROL FOR DISPLAYING TAGS ASSOCIATED WITH ITEMS IN A VIDEO PLAYBACK

RELATED APPLICATIONS

This is a continuation of U.S. patent application Ser. No. 11/562,965, filed on Nov. 22, 2006, entitled "USER CONTROL FOR DISPLAYING TAGS ASSOCIATED WITH ITEMS IN A VIDEO PLAYBACK," now U.S. Pat. No. 9,648,296, which is a continuation-in-part of U.S. patent application Ser. No. 11/499,315, filed on Aug. 4, 2006, entitled "DISPLAYING TAGS ASSOCIATED WITH ITEMS IN A VIDEO PLAYBACK." The entire disclosures of the foregoing patent applications are hereby incorporated by reference herein.

SUMMARY OF THE DISCLOSURE

A user control, such as a television remote control device, allows a user to selectively display tags during a video program. The tags provide information about items that are visible in scenes in the video. The tags can identify the brand name, item name, location where the item can be purchased, additional information about the item, etc. The tags can be turned on or off by a viewer or user during playback.

In a particular embodiment, a single button press on a remote control can cause switching from a play mode without tags to a tag mode that shows tags in the video; skipping back in time a short interval; and putting the video in a slow-forward play mode, or other alternate mode of play.

In another embodiment the tag mode can be entered and the video presentation is paused so that tags are displayed on the screen while the video is stopped at the point at which (or slightly before) the user activated a control.

Another embodiment provides for display of an indicator while the user is watching a video in the normal (tagless) mode. The indicator informs the user that tags are available and will be displayed upon user activation of a control, such as a button press on the remote control unit.

DETAILED DESCRIPTION OF EMBODIMENTS

Figure 1:
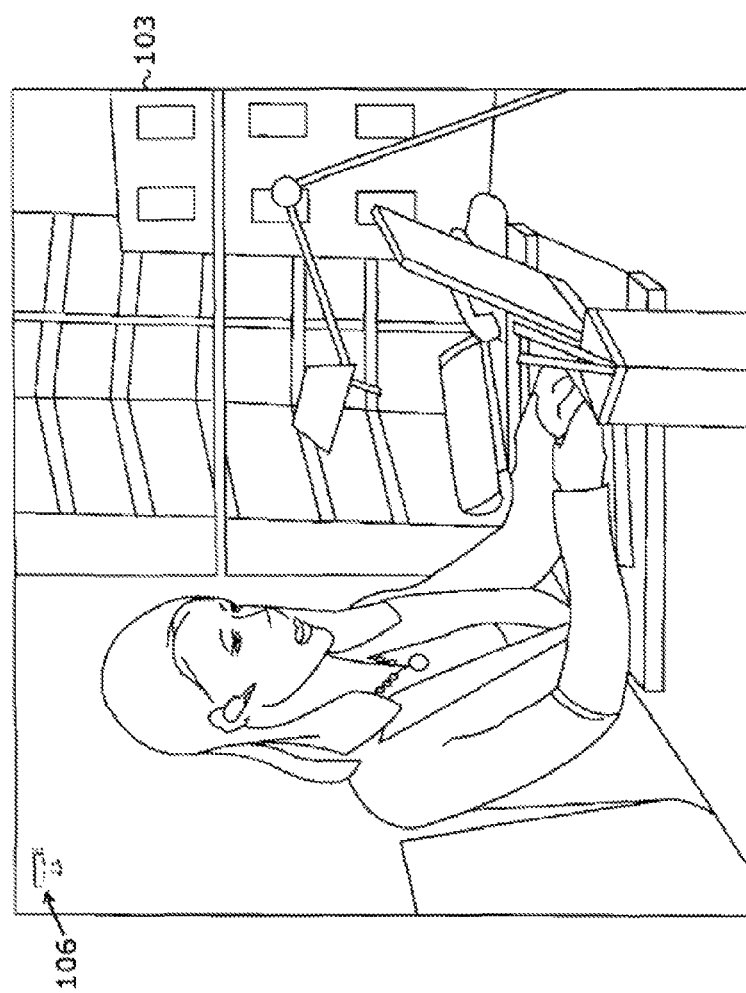
FIG. 1 shows an example of a video display including an image frame.

FIG. 1 illustrates a video display without tags. In FIG. 1, display 108 includes a typical image. In this case the image is of a woman in an office typing at a laptop at her desk while she is also talking on a wireless phone. The video plays with animation and sounds as is known in the art although only a single image frame from the video is shown in FIG. 1. Although embodiments of the invention are discussed primarily with respect to video presentations, any type of visual presentation can be adapted for use with the present invention. For example, animations, movies, pre-stored files, slide shows, Flash™ animation, etc. can be used with features of the invention.

Any type of playback device (e.g., computer system, set-top box, DVD player, etc.), image format (Motion Picture Experts Group (MPEG), Quicktime™, audio-visual interleave (AVI), Joint Photographic Experts Group (JPEG), motion JPEG, etc.), display method or device (cathode ray tube, plasma display, liquid crystal display (LCD), light emitting diode (LED) display, organic light emitting display (OLED), electroluminescent, etc.). Any suitable source can be used to obtain playback content such as a DVD, HD DVD, Blu-Ray™ DVD, hard disk drive, video compact disk (CD), fiber optic link, cable connection, radio-frequency transmission, network connection, etc. In general, the audio/visual content, display and playback hardware, content format, delivery mechanism and other components and properties of the system can vary, as desired, and any suitable items and characteristics can be used.

Figure 2:
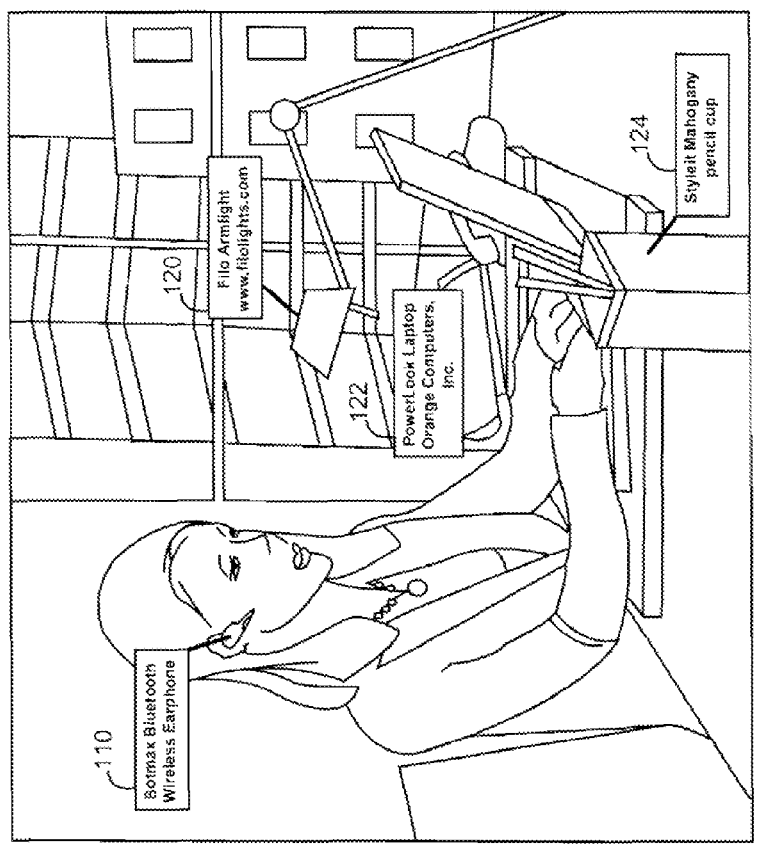
FIG. 2 shows the frame of FIG. 1 including tags in a Gadget category.

FIG. 2 shows the display of FIG. 1 with tags added to the image. In a preferred embodiment, a user can select whether tags are displayed or not by using a user input device. For example, if the user is watching a video played back on a television via a DVD player or a cable box then the user can press a button on a remote control device to cause the tags to be displayed on a currently running video. Similarly, the user can deselect, or turn off, the tag display by depressing the same or a different button. If the user is watching video playback on a computer system a keyboard keypress can cause the tags to turn on or off. Or a mouse selection of an on-screen button or command can be used. Other embodiments can use any other suitable control for invoking tag displays. Displaying of tags can be automated as where a user decides to watch a show without tags for a first time and then automatically replay the show with tags a second time.

In FIG. 2, each tag is shown with a text box and lead line. The text box includes information relevant to an item that is pointed at by the lead line. For example, tag 110 states "Botmax Bluetooth Wireless Earphone" with a lead line pointing to the earphone that is in the ear of the woman who is the subject of the scene. Thus, a viewer who is interested in such things can obtain enough information from the tag to find a seller of the earphone. Or the viewer can do an online search for the earphone by manufacturer and/or model name and can obtain more information about the earphone as research prior to making a purchase.

Other tags such as 120, 122 and 124 provide information about other items in the frame. Tag 120 states "Filo Armlight www.filolights.com" to point out the manufacturer ("Filo") and model ("Armlight") and website (www.filolights.com) relating to the light to which tag 120 is connected via its lead line. Tags can include any type of interesting or useful information about an item or about other characteristics of the image frame or video scene to which the image frame belongs.

Tag 122 points to the laptop on which the woman is typing and states "PowerLook Laptop I Orange Computers, Inc." This shows the model and manufacturer of the laptop. Tag 124 points to the pencil holder and reads "Stylelt Mahogany pencil cup." Note that more, less or different information can be included in each tag, as desired, by the company that is managing the tag advertising ("tagvertising") of the particular video content.

Figure 3:
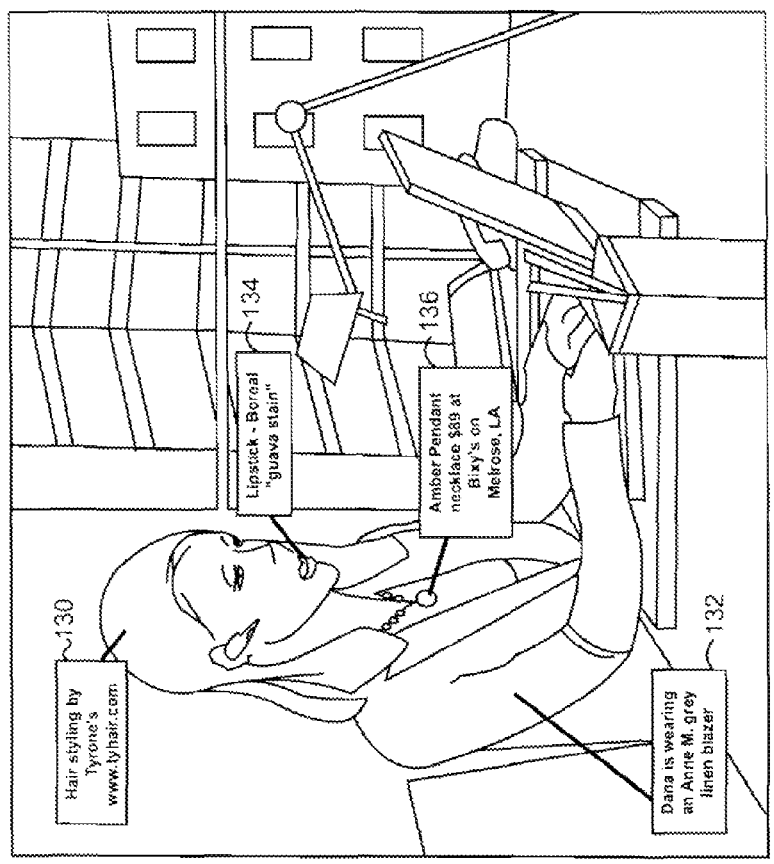
FIG. 3 shows the frame of FIG. 1 including tags in a Style category.

FIG. 3 shows additional types of items that can be tagged. In FIG. 2, the tagged items are in a "gadget" category of electronic items or physical useful objects. FIG. 3 shows a second category of "style." In this category, items such as apparel, fashion accessories, jewelry, hairstyles, makeup colors, interior decorating colors and designs, fabric types, architecture, etc. are described by information provided by tags.

Tag 130 relates to the woman's hair styling and states the hairdresser's name and website for information about the salon. Tag 132 describes the jacket designer and fabric. Tag 134 shows a cosmetics manufacturer and color of the lipstick that the woman is wearing. Tag 136 describes the material, style, price and reseller relating to the necklace.

Figure 4:
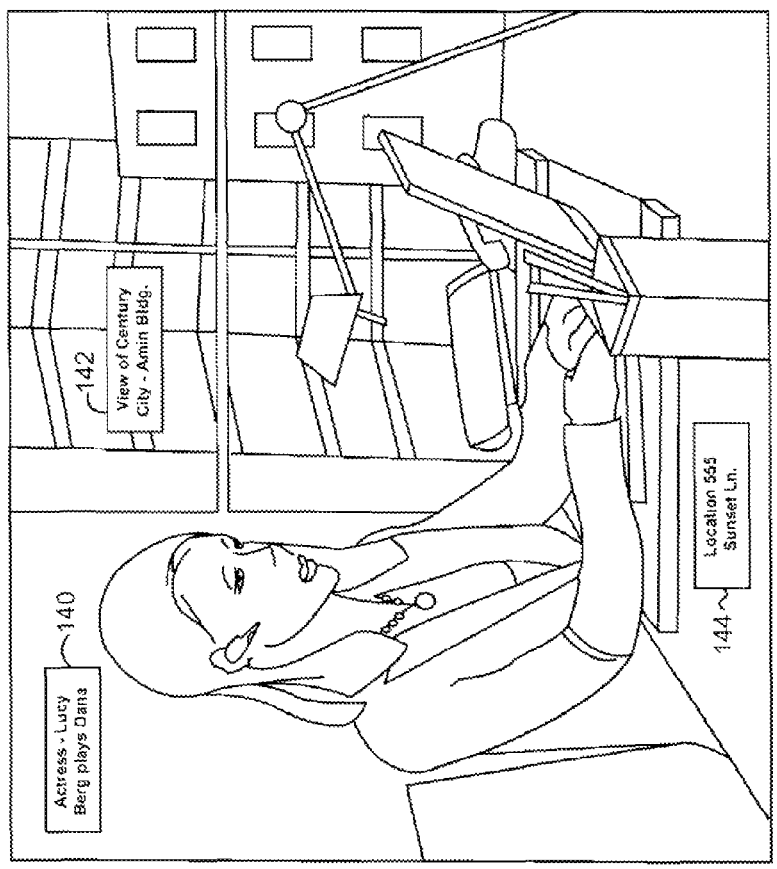
FIG. 4 shows the frame of FIG. 1 including tags in a Scene category.

In FIG. 4, another category of tags relating to the "scene" is displayed. Tag 140 describes the actress and character being played, tag 142 describes what is being seen through the window, and tag 144 shows the location of where this scene was shot. Other information relating to the scene can be provided such as time of day, type of lighting used to light the set, type of camera and camera setting used to capture the image, the name of the director, screenwriter, etc.

Tag designs can vary and can use any suitable design property. Usually it is desirable to have the tags be legible and convey a desired amount of information while at the same time being as unobtrusive as possible so that viewing of the basic video content is still possible. Different graphics approaches such as using colors that are compatible with the scene yet provide sufficient contrast, using transparent or semi-transparent windows, etc. can be employed. Tag placement can be chosen so that the tag overlays areas of the video that are less important to viewing. For example, a blank wall could be a good placement of a tag while an area over a character's face would usually not be a good placement.

Tag shape, color, position, animation and size are some of the tag characteristics that can be modified. Many different factors can affect these tag characteristics. If a specific factor, such as aesthetics, is given priority then a graphic artist or scene coordinator can be used to match the look and behavior of tags to a theme of a scene or overall presentation. For example, where a scary movie is tagged, the tag design can be in darker colors with borders having cobwebs, blood, ritual symbols, etc. For a science fiction episode, the tags can be made to look futuristic.

If an advertising factor is given priority then tags from a preferred sponsor (e.g., someone who is paying more for advertising) can be presented in bolder text, brighter colors, made larger or made to overlap on top of other tags, etc.

In general, any of the tag characteristics can be modified in accordance with one or more factors.

As the scene changes, such as when characters or objects move through or within a scene, when the camera changes angles, when there is a cut to another scene, etc., tags can also change according to a tag behavior. Different tag behaviors can be used to achieve objectives of conveying information associated with an item while still allowing viewing of the video. One behavior is to minimize the movement of a tag's text while still allowing the tag to "point" to the item. This can be accomplished by keeping the tag's text stationary with one end of the lead line connecting to the text box and the other end following a moving item to which the text relates.

Another tag behavior is to shrink or enlarge a tag's text box according to the relative size of the item associated with the tag. For example, if an item is in the foreground then the tag's text area can be larger. As the item moves farther from the camera and becomes smaller, then the tag can become smaller and can eventually be removed from the screen. The manner of shrinking the text area can include making the actual text smaller, removing text from the display while retaining other text, replacing the text with alternative text, etc. Tags may be displayed for items that are not visible in the same frame as the tag.

Although tags are shown having a lead line that connects the tag text area with an associated item, other tag designs are possible. For example, a line may end in an arrowhead to "point" in the general direction of an associated item. A cartoon bubble with an angled portion that points to an item can be used. If the tag is placed on or near its associated item then a lead line or other directional indicator may not be necessary. In other words, the placement of the tag or text can be an indicator of the associated item. Any suitable, desired or effective type of indicator for associating tag information with an item may be employed. Many other variations of tag characteristics or behavior are possible.

Figure 5:
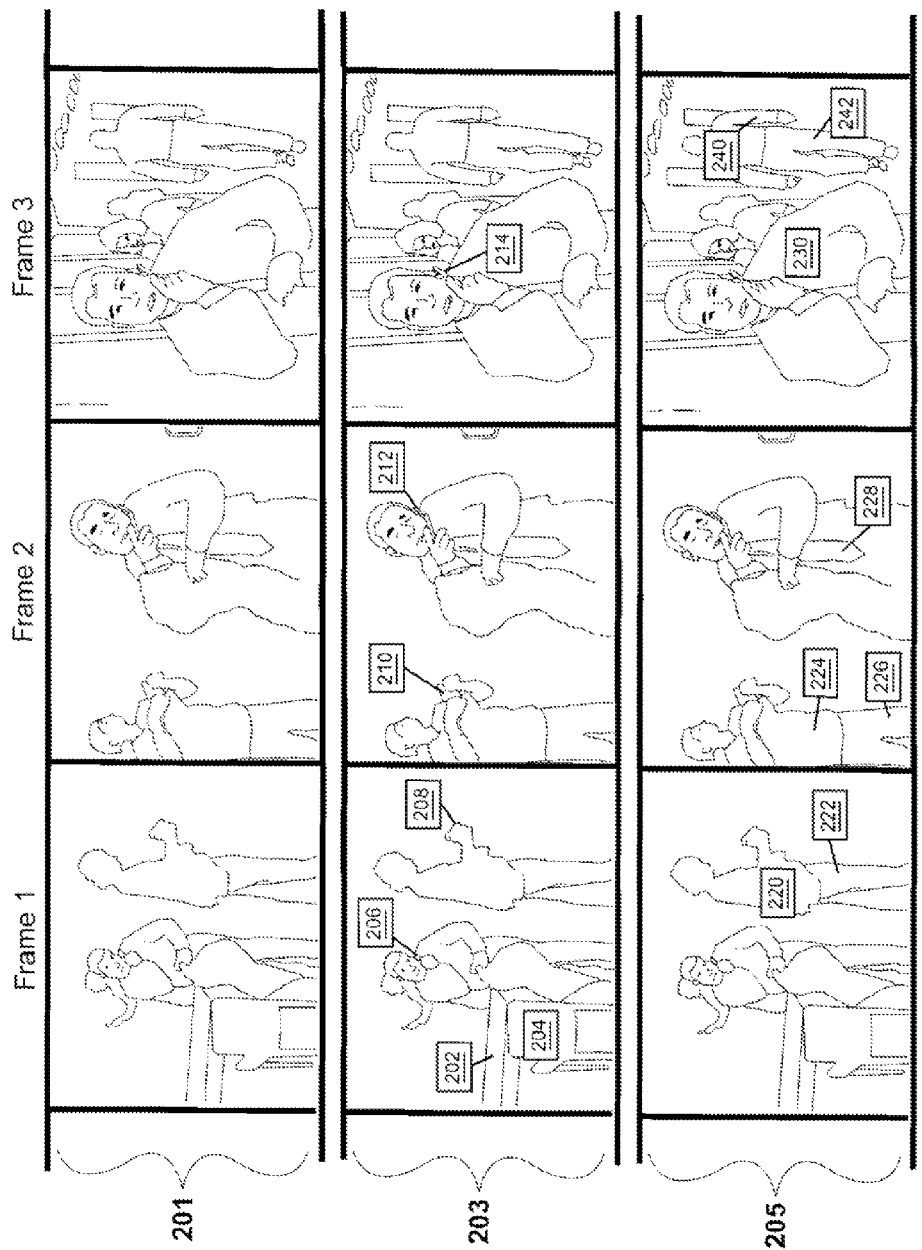
FIG. 5 shows an original sequence and two corresponding tag sequences.

FIG. 5 shows an original sequence and two corresponding tag sequences. In FIG. 5, original sequence 201 is a video clip of a man walking out of a room while talking on a cell phone and putting on a suit jacket. Gadget tag sequence 203 shows the synchronized same clip as original sequence 201 with gadget tags added. Style tag sequence 205 shows the synchronized same clip as original sequence 201 with style tags added.

In gadget tag sequence 203, the first frame of the sequence corresponds with the first frame of original sequence 201. Note that the progression of time is shown as three snapshots along the horizontal axis. As is known in the art, this method of showing video animation on paper uses one or a few "key frames" to show progression of the action. In actuality, the video clip represented by the three key frames would include hundreds of frames displayed over 10-20 seconds. This is only one example of coordinating a visual presentation with tag sequences. Any number and type of frames can be used. Any suitable format, frame resolution, compression, codec, encryption, enhancement, correction, special effects, overlays or other variations can be used. Aspects or features described herein can be adapted for use with any display technology such as three-dimensional renderings, multiple screens, screen sizes and shapes, etc.

Original sequence 201 does not have tags so that a user or viewer that watches the original sequence can view the original program without tags. If, at any time during the sequence, a user selects gadget tag sequence 203, then the display is changed from displaying the original sequence to display a corresponding frame of the gadget tag sequence. In other words, if a user selects the gadget tag sequence at or shortly before presentation of the first frame, then the display is switched to gadget tag sequence 203 at frame one. In frame one of the gadget tag sequence tags 202, 204, 206 and 208 are displayed. These correspond, respectively, to table, chair, cell phone and camera items that are visible in the scene.

Frame two of gadget tag sequence 203 shows personal digital assistant (PDA) tag 210 and cell phone tag 212. Frame three of gadget tag sequence 203 shows cell phone tag 214. Note that the user can selectively switch between the gadget tag and original sequences. For example, if the user decides to view the program without tags while viewing gadget tag sequence 203 at or about frame two then original sequence 201 will begin displaying at the corresponding location (e.g., at or about frame two) in the original clip.

Style tag sequence 205 corresponds with each of the original and gadget tag sequences similar to the manner in which the gadget tag sequence is described, above, to correspond with the original sequence. In frame one of the style tag sequence, shirt tag 220 and pants tag 222 are shown. Note that these tags are not present in gadget tag sequence 203. This is so the user can select a category of tags (either gadget or style) to display independently to prevent too many tags from cluttering the scene. Other frames in the style tag sequence include tags having to do with clothing such as shirt tag 224, pants tag 226 and tie tag 228 in frame two; and suit tag 230, shirt tag 240 and pants tag 242 in frame three.

Note that any number and type of categories can be used. Provision can be made to overlay two or more categories. Other approaches to segregating or filtering tags can be used. Depending upon the capabilities of the playback system, tags can be selected, mixed and filtered. For example, if a user's preferences are known then tags that meet those preferences can be displayed and tags that do not meet those preferences can be prevented from display. A user can enter keywords to use to display tags that match the keywords. For example, "electronics" or "autos" can be used as keywords so that only tags that describe items that match the keywords are displayed. A user might select an option whereby tags that were previously displayed are then prevented from display. Or only tags that were previously displayed can be allowed for display. Any type of approach for selectively displaying tags can be adapted for use with the invention.

Although FIG. 5 illustrates selection of tag categories based on multiple sequences of video, this is not a requirement of an implementation of displaying tags. The next sections of this application present embodiments where separate sequences are used. However, other implementations can use different approaches to achieve the desired effect at the user interface without actually having separate video clips or streams. For example, a computer processor can be used to overlay tags onto video.

The tags can be stored as separate graphics together with, or separate from, data that defines the video sequence. Or the tag graphics can be generated by a processor in real time according to predefined rules or definitions. With this approach, only one video sequence—the original video sequence—may be presented as the graphics for the tags are then simply added into the video frames when selected. The positioning of the tags can be by pre-stored coordinates that are associated with frames in the video. Each coordinate set can be associated with a particular tag by using a tag identification (ID) number, tag name or other identification or means. In general, any suitable presentation system can be used to provide the user interface (e.g., display effects and user input processing) of embodiments of the invention.

Figure 6:
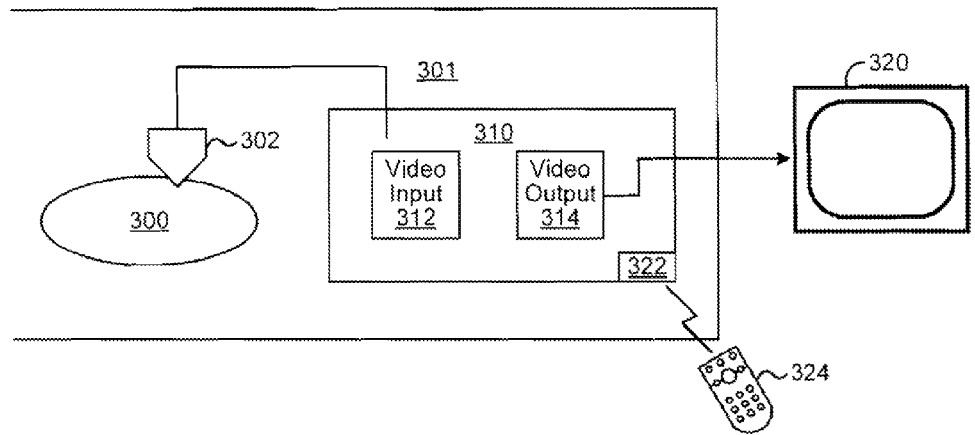
FIG. 6 shows a DVD player system suitable for use with the present invention.

FIG. 6 shows a DVD player system suitable for use with the present invention. Any specific hardware and software described herein are only presented to provide a basic illustration of but one example of components and subsystems that can be used to achieve certain functionality such as playback of a video. It should be apparent that components and processes can be added to, removed from or modified from those shown in the Figures, or described in the text, herein.

In FIG. 6, DVD player 301 plays DVD 300. DVD 300 contains multiple sequences of video information that can be read by optical read head 302. The video information obtained by the read head is transferred for processing by processing system 310. Processing system 310 can include hardware components and software processes such as a central processing unit (CPU) and storage media such as random access memory (RAM), read-only memory (ROM), etc. that include instructions or other definitions for functions to be performed by the hardware. For example, a storage medium can include instructions executable by the CPU. Other resources can be included in processing system 310 such as a hard disk drive or other mass storage, Internet connection, audio processing circuitry and processes, etc. Many variations are possible and many different types of DVD players or other systems for presenting audio/visual content can be used.

Video data is received at video input 312. Video for presentation is processed and output by video output 314. The output video is transferred to display 320. The formats for input and output video can be of any suitable type. A user input device such as remote control unit 324 is used to provide user selection information to sensor 322. The sensed information is used to control display of the tags.

Figure 7:
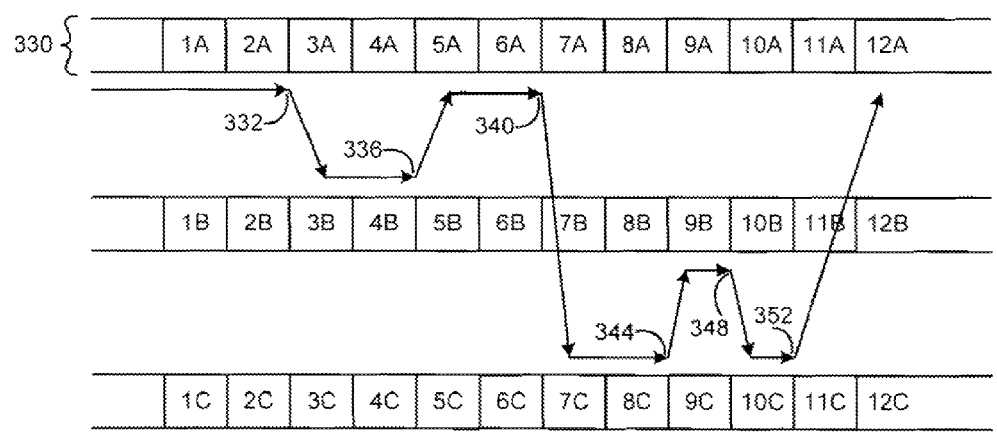
FIG. 7 illustrates multiple sequences of video including tag sequences.

FIG. 7 illustrates multiple sequences or streams of video that can be included on a DVD disc. These sequences can be coordinated so that they can be played back in a time-synchronous manner. One such method of synchronizing multiple video streams is standardized in specifications promulgated by the DVD Format/Logo Licensing Corporation such as "DVD Specifications for Read-Only Disc; Part 3 Video Specifications, Version 1.13, March 2002." An acceptable method is described in this Specification as "multi-angle" and/or "seamless play." Such an approach is also described in U.S. patent application Ser. No. 5,734,862. Note that any suitable method that allows selection and display of synchronized video streams can be used.

In FIG. 7, it is assumed that the DVD begins playing on sequence A at 330. Sequence A is, for example, the original video sequence without tags. At a point near the beginning of playing of frame 3A of sequence A the user activates a control (e.g., pressing a button, etc.) to select sequence B at 332. Playback of the video then switches from sequence A to sequence B so that frame 3B is displayed on display 320 instead of frame 3A. Subsequent frames from sequence B are displayed such as frame 4B, et seq.

At a time prior to display of frame 5B, a signal is received from a user input device to select the original sequence A. So frame 5A is then displayed instead of frame 5B. Similarly, a signal causes switching at 340 to display frame 7C from sequence C. Subsequent switching of sequences occurs at 344 to switch to sequence B, at 348 to switch to sequence C and at 352 to switch to sequence A. Sequences B and C can be tag sequences (e.g., Gadget and Style types of tags, respectively) so that FIG. 7 illustrates switching among video sequences in a multi-angle (with optional seamless play) system to achieve the functionality described above in the discussion of FIGS. 1-5.

A broadcast or cable television embodiment can also be used to provide tags in a manner similar to that described above for a DVD player. In a radio-frequency, optical or cable set-top box approach, the multiple streams can be provided on different channels. Instead of reading the video data from an optical disc, the video sequences are obtained from different channels and switching between streams is effected by changing channels. This channel approach is convenient in that it does not require any modification to existing consumer equipment since it relies only on providing specific content on specific channels (e.g., on channels that are adjacent in channel number, for example).

Modification may be made to incorporate multiple sequences in a single channel. For example, if the channel bandwidth is high enough to accommodate two or more streams then a single channel can be used to convey the streams. Separation and selection of the streams can be by a manner that is known in the art.

Other playback or presentation systems are possible. For example, a computer system, iPod™, portable DVD player, PDA, game console, etc. can all be used for video playback and can be provided with functionality to display tags. Where a system includes sufficient resources such as, e.g., a processor and RAM, it is possible to store tags along with maps of when and how to display each tag. The tag maps can be stored as coordinate data with IDs that associate a tag graphic with a location and time of playback. Time of playback can be designated, for example, by a frame number, elapsed time from start of playing, time code from a zero or start time of a sequence, etc. When the time associated with a tag is encountered (and assuming tag mode is selected for playback) then the coordinates are used to display the associated tag's graphic. Other information can be included.

With more sophisticated presentation systems, additional features can be allowed. For example, a user can be allowed to use a pointer to click on or near a tag. The click can result in a hyperlink to additional information such as information at a website. A portion of the additional information (including a website) can be displayed on the display in association with, or in place of, the original or tagged video.

One manner of providing hyperlink data in a limited presentation device is to associate link information with tags. These associations can use a table that is loaded into the presentation device. One simple type of association is to display a number on a tag. A user can then select the number or tag by using the remote control device, keyboard, keypad, pointer, etc. and the information associated with the tag identified by the number can then be presented. For example, if a DVD player detects that the user has chosen freeze-frame to stop the playback of a tagged sequence, and then the user enters a number of a tag on the screen, it can be assumed that the user wishes to obtain more information about that tag. Pre-stored additional information can be displayed on the screen or on another device. Other ways of identifying tags or items to obtain more information about an item are possible.

If a user registers or associates other devices with their name or account, an email can be sent to the other device from a central service. The email can include additional information about the selected item. A web page can be displayed on the same device that is displaying the video or another device can have the web page (or other data) "pushed" to the device to cause a display of the additional information.

Figure 8:
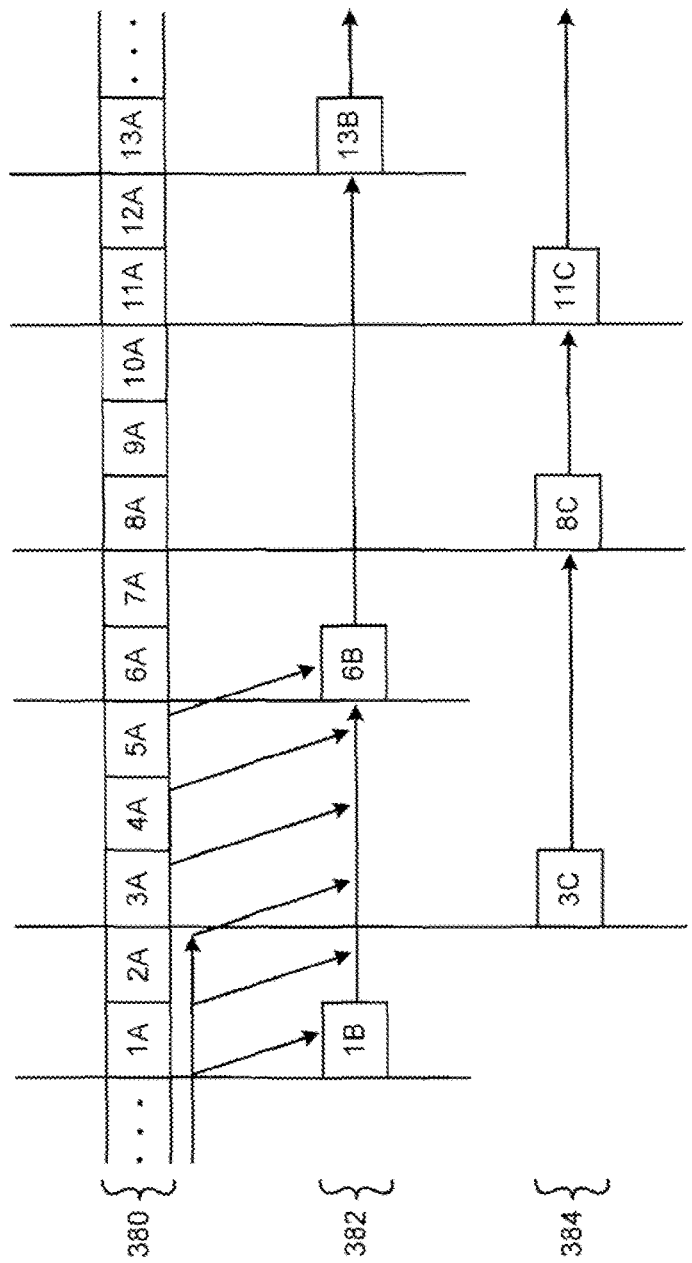
FIG. 8 shows an example of still-frame tag sequences.

FIG. 8 shows an example of still frame tags. In FIG. 8, sequence 380 is the original video sequence. Sequences 382 and 384 are tag sequences. However, sequences 382 and 384 are not in one-to-one frame correspondence with the original video sequence. Instead, the tag sequences only use one frame to correspond with multiple frames of the video sequence. Depending on the ratio of tag frames to original video frames, much less information needs to be transferred than with the full sequence approach of FIG. 7.

For example, if the number of items remains relatively constant for many seconds in a playback of the original video, a still frame that is representative of the overall image during the un-changing sequence can be used as the frame that is switched to from any point in the un-changing sequence. This is shown in FIG. 8 where selection of sequence 382 during playback times associated with frames 1A-5A causes frame IB to be displayed. Similarly, frame 6B is displayed if sequence 382 is selected during playback of 6A-12A.

Sequence 384 also has a still-frame tagged sequence so that frame 3C will be displayed if sequence 384 is selected at any time during the display of the original video sequence corresponding to frames 3A-7A. Note that still-frame sequences can be mixed with fully synchronized (i.e., non-still frame) sequences, as desired. Also, the image in the original video sequence need not be un-changing in order to employ still-frame sequences as still-frame sequences can be used with any type of content in the original video sequence.

Still frames such as IB, 6B, 13B, 3C, 8C and 11C are displayed for the same time interval as the corresponding frames of sequence 380. In other words, if frame IB is selected at a time just before displaying frame IA during playback of sequence 380, then frame IB will be displayed in the interval that would have been occupied by playback of 1A-5A. At the time corresponding to display of frame 6A (had playback remained on sequence 380) frame 6B is displayed. This allows jumping from the original sequence to a still-frame tagged sequence and jumping back to the original sequence while maintaining time-synchronization with the original video.

The audio track can remain playing over the display of the still-frame tagged sequence. Alternatively, when jumping from a still-frame tagged sequence back to the original video, the original video sequence can be resumed from the point where it was exited in order to view the tagged sequence. Features discussed above with respect to non-still frame tagged sequences can be applied to still frame tagged sequences.

Figure 9:
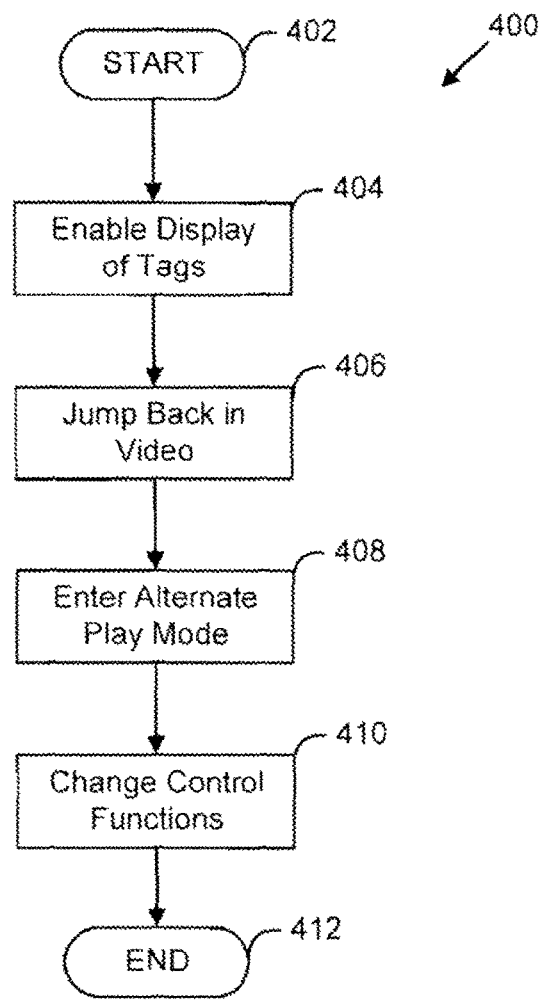
FIG. 9 shows a flowchart of basic actions in an embodiment of the invention.

FIG. 9 illustrates basic steps in one procedure for placing a video (or other visual presentation) into a tagged mode from a normal play mode. The video can be playing on any type of device with any source and format of video or other visual information. Although the procedure is presented in a flowchart, any type of automated implementation of the functionality of the flowchart can be used. For example, the actions of the flowchart can be performed by a processing system (e.g., processor, memory, storage media, etc.), dedicated circuitry, field-programmable gate array (FPGA), programmable logic device (PLD), etc.

The routine represented by flowchart 400 of FIG. 9 is entered at 402 when a user input is detected. Such a user input can be from a user input control such as a button on a remote control device. Any type of control or command input can be used including physical controls, (e.g., buttons, dials, toggle switches, sliders, etc.), on-screen controls (selected, e.g., by a mouse or pointing device, or by a computer input device, etc.), image or gesture detection, voice/sound detection or recognition, etc.

Step 404 is next executed to enable a display of tags in the video. The acts required to enable the tag display will vary depending upon the display platform being used (set-top box, DVD player, computer, etc.). At step 406 the video presentation is jumped back in time and restarted. In a preferred embodiment, the interval of restarting should be timed to take into account the user's typical delay between deciding that they want to see a tag at a point in the video and actually activating the control to change to the tagged mode. It is contemplated that this delay may be about 2 seconds. Naturally, any other delay interval can be used to jump back in the video for the restart. In some embodiments it may be desirable to calculate the restart interval based on how much action has taken place on the screen, or when the last significant tagged objects were displayed on the screen. Still other embodiments may want no interval (i.e., step 404 can be skipped) or a jump forward in time. Any timing manipulation is possible depending upon the video playing ability of the platform (e.g., random seeking of a video frame).

At step 408 the video playback can be made to enter an alternate mode of playing from the normal mode. Examples of alternate modes include fast or slow forward play, pause, playing with effects, playing muted, playing with captions, playing with increased or reduced frame rates, etc. In general, any modification to the normal play mode can be used. In a preferred embodiment, the alternate play mode includes slow forward with muting. The user can press the Play button on the remote to cause normal speed play without muting and the tags will still be displayed. Other transport controls such as Pause, Fast Forward, Reverse, etc. are fully functional.

At step 410 the control functions are changed. This is useful, for example, so that a single button can be used to place the video into a normal or tagged mode of play. If the typical Enter button on a remote is used to enter the tagged mode of play then step 410 can cause the next press of the Enter button to exit the tagged mode back into the normal (untagged) mode of play. It may be useful to change other control functions based on being in normal or tagged modes of play. For example, in tagged mode, the skip forward and back buttons can be used to skip forward or backward to the previous or last change of tags on the screen. Other buttons, such as the number buttons, can be changed so that instead of acting as numeric keys (for a channel change, for example) they are used to select different categories of tags (e.g., "1" for Gadget, "2" for Style, "3" for Scene, etc. Any other control modification can be employed. Control functions can revert back to their original functions when tagged mode is exited. The routine exits at step 412.

Note that the steps of flowchart 400 can be performed in any order. Typically, they will be performed so quickly that the user will perceive them as occurring simultaneously, but that is not a requirement. Any suitable implementation of one or more of the steps of flowchart 400 can result in a useful user control mechanism for displaying tags. Merely switching to a tagged mode of play from a normal mode of play can be acceptable.

Another feature is to show a tag icon during normal playback to let the user know that tags are available. Tag icon 106 in FIG. 1 shows a "T" in the upper left of the screen whenever tags are available for the current images that are playing in a normal mode. If the user switches to a tagged mode the tag icon can change to a label (e.g., "Gadget," "Style," "Scene," etc.) to let the user know the category of tagged mode that is being displayed. This is useful in case there are sections of the video that do not have any tags in the selected category (or any tags at all).

Any other type of indicator can be used to show that tags are accessible from a normal play mode. For example, a dedicated light-emitting diode (LED) on the remote or on the display can be used. If the display is on a computer system a dedicated or unused area (e.g., screen or frame border, another window, etc.) can be used. Vibration or other tactile feedback can be used. Audio alerts such as a tone or bell can be employed. Recorded or synthesized speech can similarly be used. The indicator can be on a device related to presenting or playing video (e.g., a home theater system) or it can be on a different device. In general, any suitable type of indication can be used.

Any suitable programming language can be used to implement features of the present invention including, e.g., C, C++, Java, PL/I, assembly language, etc.

Different programming techniques can be employed such as procedural or object oriented. The routines can execute on a single processing device or multiple processors. The order of operations described herein can be changed. Multiple steps can be performed at the same time. The flowchart sequence can be interrupted. The routines can operate in an operating system environment or as stand-alone routines occupying all, or a substantial part, of the system processing.

Steps can be performed in any order by hardware or software, as desired. Note that steps can be added to, taken from or modified from the steps in the flowcharts presented in this specification without deviating from the scope of the invention. In general, the flowcharts are only used to indicate one possible sequence of basic operations to achieve a function.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment," or "a specific embodiment" means that a particular feature, structure, or characteristic described in connection with the embodiment is included in at least one embodiment of the present invention and not necessarily in all embodiments.

Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

The invention claimed is:

1. A method for controlling display of one or more visually perceptible tags in association with a video, the method comprising:
   receiving a first signal from a user input control device while the video is being presented via a display device without any visually perceptible tags, wherein the first signal is generated by the user input control device in response to activation of a control associated with a function of causing the display device to present the video with the at least one visually perceptible tag;
   in response to receiving the first signal from the user input control device, causing the display device to present the video with at least one visually perceptible tag; and
   after causing the display device to present the video with the at least one visually perceptible tag, changing the function associated with the control to thereafter cause the display device to present the video without any visually perceptible tags.

2. The method of claim 1, further comprising:
   in response to receiving the first signal from the user input control device, causing the display device to present the video in an alternate play mode.

3. The method of claim 2, wherein the alternate play mode includes slow forward play.

4. The method of claim 2, wherein the alternate play mode includes a reduced frame rate of play.

5. The method of claim 1, further comprising:
   after changing the function associated with the control, receiving a second signal from the user input control device, wherein the second signal is generated by the user input control device in response to activation of the control; and
   in response to receiving the second signal, causing the display device to present the video without any visually perceptible tags.

6. The method of claim 1, further comprising:
   while the video is being presented via the display device without any visually perceptible tags, determining whether the at least one visually perceptible tag is available to be presented via the display device; and
   in response to determining that the at least one visually perceptible tag is available to be presented via the display device, causing an indicator to be presented, wherein the indicator is configured to make a viewer aware that the at least one visually perceptible tag is available to be presented via the display device and wherein the first signal is received from the user input control device after the indicator is caused to be presented.

7. The method of claim 6, wherein the indicator comprises an icon presented on the display device.

8. The method of claim 6, further comprising:
   in response to determining that the at least one visually perceptible tag is not available to be presented via the display device, preventing the indicator from being presented.

9. The method of claim 6, wherein the indicator comprises one or more of a light-emitting diode on the input control, a light-emitting diode on the display device, or an audio alert.

10. The method of claim 1, wherein content of each of the at least one visually perceptible tag comprises descriptive information describing a visually perceptible item in the video.

11. The method of claim 10, wherein the descriptive information comprises one or more of a brand name associated with the visually perceptible item, a manufacturer of the visually perceptible item, information about a seller of the visually perceptible item, and a price associated with the visually perceptible item.

12. The method of claim 1, wherein a visually perceptible tag further comprises a box and wherein content for a visually perceptible tag appears within the box.

13. The method of claim 12, wherein the box of a visually perceptible tag has a rectangular shape.

14. The method of claim 12, wherein the box has a background color.

15. The method of claim 1, wherein a visually perceptible tag comprises a content area and a lead line between the content area and an item in the video.

16. The method of claim 1, wherein the control is one of multiple controls associated with a function of causing the display device to present the video with the at least one visually perceptible tag, and wherein each of the multiple controls is associated with a function of causing the display device to present the video with a different category of visually perceptible tags.

17. The method of claim 16, wherein the different categories of visually perceptible tags comprise gadget tags, style tags, and scene tags.

18. The method of claim 1, wherein the user input control device is a remote control.

19. An apparatus for controlling display of one or more visually perceptible tags in association with a video, the apparatus comprising:
- a receiving component configured to receive one or more signals from a user input control device; and
- a hardware processor configured to be operatively associated with the receiving component, the hardware processor configured to:
  - receive from the receiving component a first indication that the receiving component has received a first signal from the user input control device, wherein the first signal is received while the video is being presented via a display device without any visually perceptible tags, and wherein the first signal is generated by the input control in response to activation of a control associated with a function of causing the display device to present the video with the at least one visually perceptible tag; and
  - in response to receiving from the receiving component the first indication that the receiving component has received the first signal from the user input control device, cause the display device to present the video with at least one visually perceptible tag; and
  - after causing the display device to present the video with the at least one visually perceptible tag, change the function associated with the control to thereafter cause the display device to present the video without any visually perceptible tags.

20. A non-transitory computer-readable medium having instructions stored thereon, the instructions comprising:
- instructions for causing a display device to present a video with at least one visually perceptible tag, wherein the display device is caused to present the video with the at least one visually perceptible tag in response to receiving a first signal from a user input control device while the video is being presented via the display device without any visually perceptible tags, wherein the first signal is generated by the user input control device in response to activation of a control associated with a function of causing the display device to present the video with the at least one visually perceptible tag; and
- instructions for, after causing the display device to present the video with the at least one visually perceptible tag, changing the function associated with the control to thereafter cause the display device to present the video without any visually perceptible tags.

* * * * *